Sept. 18, 1962 R. E. SPENCER 3,054,573
TAPE MEASURE APPARATUS
Filed June 10, 1960 2 Sheets-Sheet 1

INVENTOR.
Roy E. Spencer
BY
Atty.

Sept. 18, 1962  R. E. SPENCER  3,054,573
TAPE MEASURE APPARATUS
Filed June 10, 1960  2 Sheets-Sheet 2
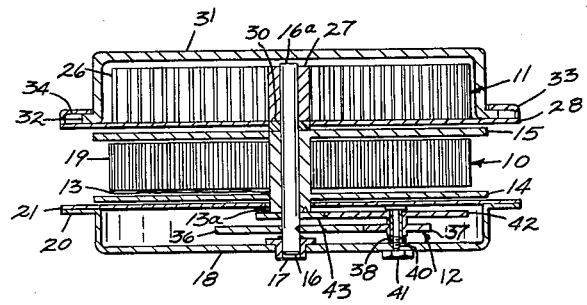
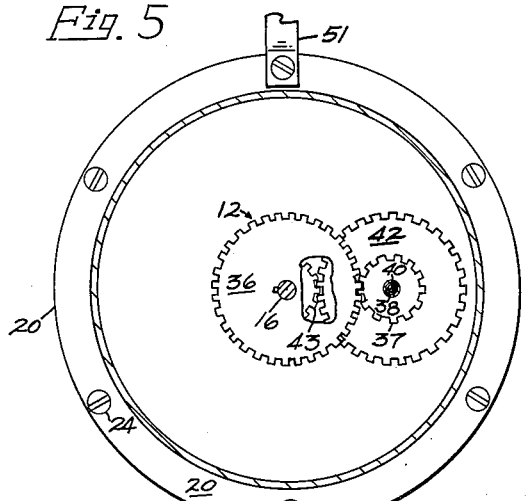
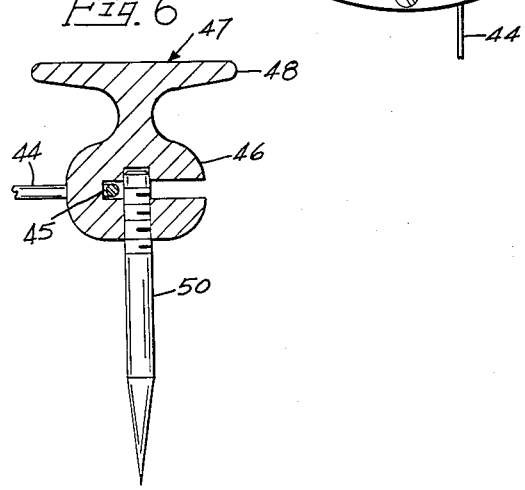
INVENTOR.
Roy E. Spencer
BY
Atty.

United States Patent Office 3,054,573
Patented Sept. 18, 1962

3,054,573
TAPE MEASURE APPARATUS
Roy E. Spencer, P.O. Box 224, Pullman, Wash.
Filed June 10, 1960, Ser. No. 35,235
1 Claim. (Cl. 242—107.5)

This invention relates to a novel tape measure apparatus particularly adapted for heavy usage such as encountered in logging operations.

Various types of tape measures are available today which utilize spring tension to rewind the tape. However, the larger sizes of tapes (fifty feet and longer) are normally wound manually or by a spring which in turn must first be manually wound by the user. This necessitates the provision of an external handle on the mechanism, which is in constant danger of being broken or damaged by dropping the case or by contact with other tools.

It is an object of this invention to provide a tape measure apparatus enclosed within a smooth housing with no projecting parts or external moving sections which might be subject to damage. It is another object to enclose the spring motor and the driving gears in separate sealed compartments, with provision for access to either compartment without disturbing the other.

It is still another object of the invention to enclose the spring in such a fashion that it can easily be wound, when required, without dismantling the apparatus.

Another object is to provide a tape anchor which is peculiarly adapted for use with logs or semi-soft materials. It utilizes a sharp pin, which is replaceable and the anchor itself is easily removable from the tape when not desired.

These and still further objects will be evident from a study of the following description and the accompanying drawings which illustrate a preferred form of the invention.

In the drawings:

FIGURE 4 is a sectional view taken along line 4—4 of FIGURE 1;

FIGURE 5 is a sectional view taken along line 5—5 of FIGURE 2 with a portion of the center gear broken away; and FIGURE 6 is a sectional view taken along line 6—6 in FIGURE 2.

Figure 1:
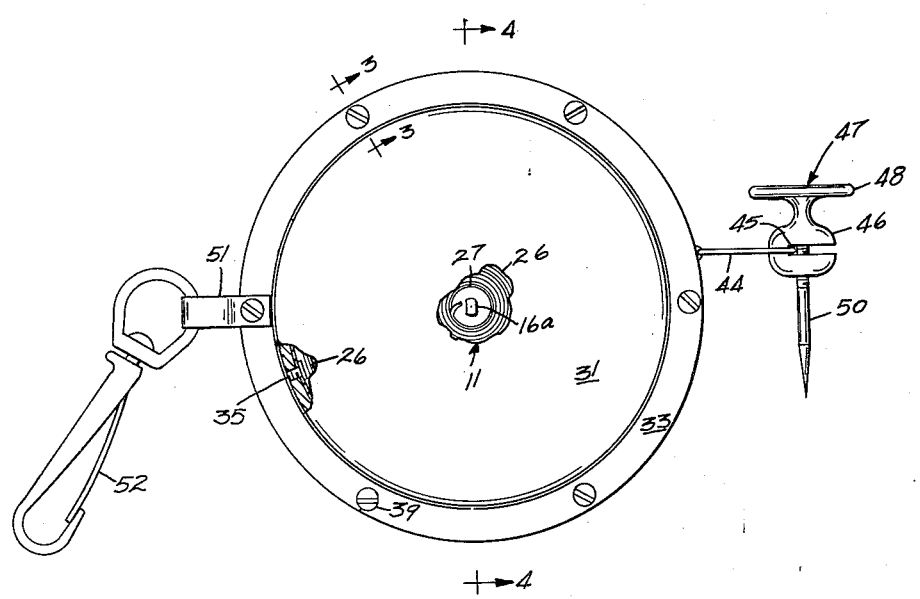
FIGURE 1 is a top view of the apparatus looking at the spring cover plate, with the central portion of this plate being broken away.
Figure 2:
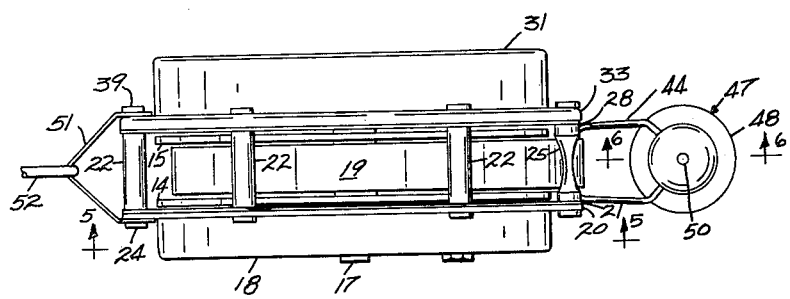
FIGURE 2 is a front view of the apparatus with a portion of the belt clasp broken away.
Figure 3:
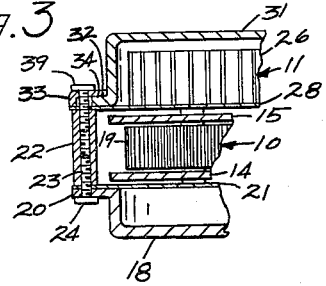
FIGURE 3 is a fragmentary sectional view taken along line 3—3 of FIGURE 1.

Referring now to the drawings, a preferred form of the invention is shown. Although capable of a wide variety of applications, this tape measure was primarily designed for usage in logging operations to measure the lengths of fallen logs. It was designed to withstand rough usage and to enable one to easily repair any broken parts in the field. The tape measure consists of three interrelated systems, each being independently housed within an integral assembly. They consist of a tape mechanism 10, a spring motor and a gear mechanism 12.

The tape mechanism 10 is composed of a roll of metal measuring tape 19 which is calibrated in the desired manner and which has its inner end secured to a central sleeve 13 of a guiding spool having circular sides 14, 15. The sleeve 13 is rotatably carried by a center shaft 16 which extends through the gear mechanism 12 and is rotatably journalled at one end by means of a bearing 17 inserted within an aperture cut through the outside cover 18 on the gear mechanism 12. The cover 18 is dished and includes a peripheral flange 20. Mounted against the inner surface of flange 20 is a circular dust cover 21 which has an aperture to receive the extension 13a of sleeve 13. The combination of cover 18 and dust cover 21 results in a sealed casing for the gear mechanism 12.

A series of five spacing rods 22 are shown circumferentially located along the outer portion of dust cover 21. Each rod 22 is provided with a tapped hole 23. Screws 24 secure the covers 18 and 21 to the rods 22. The rod 25 adjacent the tape exit is concave so as to minimize the rubbing wear on tape 19 as the tape 19 is drawn to and from the tape mechanism 10. It is similarly tapped and receives a screw 24.

The spring motor 11 consists of a wound spring 26 which has its inner end secured to a collar 27. Collar 27 is mounted on a milled end 16a of center shaft 16 so as to turn with shaft 16. An inner dust cover 28 is provided between spring 26 and side 15 of the tape spool. A central bearing 30 mounted on cover 28 rotatably supports shaft 16. A dished outer cover 31 is provided, having a short flange 32. Flange 32 is overlapped by a ring 33 which has an inner edge 34 that is adjacent to cover 31. Screws 39 secure ring 33 and cover 28 to the remaining ends of the spacing rods 22 and rod 25. The ring 33 securely holds cover 31 against the dust cover 28. The outer end of coiled spring 26 is secured to the inner cylindrical wall of cover 31 by means of a small set screw 35.

The gear train within the gear mechanism has a first large diameter gear 36 fixed to shaft 16 adjacent to the inner surface of cover 18. This gear 36 is in meshing engagement with a small gear 37 of a compound gear which is rotatably mounted on a bushing 38 carried by a screw 40 secured to cover 18 by means of a flat nut 41. The second larger diameter gear 42 of the compound gear meshes with a smaller gear 43 fixed to extension 13a of sleeve 13.

The outer end of tape 19 is provided with a bent wire loop 44 which is wider than the tape 19 so as to prevent its entry between covers 21 and 28. This loop 44 is received by a slot 45 formed horizontally through a portion of the body 46 of the anchor 47. The body 46 is generally cylindrical and has a button top 48. The lower surface of body 46 is apertured and tapped, and threadably receives the top end of a pin 50 which locks loop 44 within anchor 47. The pin 50 is easily replaced and is used to remove anchor 47 from loop 44.

A second loop 51 is provided on the outer surfaces of cover 18 and ring 33. Loop 51 secures a belt clasp 52 adapted to hold the apparatus for carrying purposes.

In use, the spring 26 is provided with a slight amount of initial tension so as to hold loop 44 against the covers 21, 28. The initial point of measurement is marked by placement of the sharp pin 50 and the apparatus is carried to the final point of measurement, where the distance along the calibrated tape 19 may be recorded. The tape 19 will wind spring 26 while it is being played out. This increased tension in spring 26 is used to return the tape 19 to the apparatus after completion of the measuring process. The gears 36, 37, 42, 43 serve to step up motion from shaft 16 to sleeve 13 so as to provide a fast tape retrieve.

As spring 26 is used, it will gradually lose tension power. In order to increase its tension, the screws 39 are loosened and cover 31 may be rotated as desired, using edge 34 as a guide. This feature is extremely useful when a new tape 19 is required, due to wear or breakage. The tension of spring 19 is thus easily adjusted without dismantling the apparatus. Should a new spring 19 be required, it may be replaced by removing screws 39 only—the gear mechanism 12 need not be disturbed. The same is true of the gear mechanism 12. Removal of screws 24 enables one to work on the gear mechanism 12 without disturbing the remaining parts. Both the spring motor 11 and the gear mechanism 12 are totally sealed in individual compartments, thus protecting the enclosed elements from dust and wear. All parts of the assembly are easily replaced in the field without the necessity of specialized tools. The entire assembly is enclosed in a smooth metal case and is extremely resistant to damage, despite rough working conditions.

It is obvious that minor changes can be made without deviating from the invention. Therefore the example illustrated in the drawings is not to limit or detract from the scope of the invention as defined in the annexed claim.

Having thus described my invention, I claim:

In a spring-governed reel assembly, a pair of flat disk-shaped dust covers fixed to one another in parallel axially aligned positions by spacer assemblies mounted about their respective peripheries, a central shaft rotatably journalled by said dust covers for rotation about an axis perpendicular to the dust covers and extending outwardly beyond each of said dust covers, a reel rotatably journalled on said shaft intermediate said dust covers, gear means located outwardly adjacent a first one of said dust covers drivingly connecting said shaft to said reel; a first dished cover secured to said one of said dust covers and enclosing said gear means, a spiral spring mounted about the shaft at a position outwardly adjacent to the remaining dust cover, the inner end of the spring being fixed to the shaft, a second dished cover enclosing said spring, the outer end of the spring being fixed to the second dished cover, said second dished cover including an outwardly extending radial peripheral flange abutting the outer surface of said remaining dust cover, and a clamping ring mounted on the outer surface of said remaining dust cover and overlapping said flange adapted to selectively clamp the flange to said remaining dust cover.

References Cited in the file of this patent

UNITED STATES PATENTS

| | | |
|---|---|---|
| 1,374,459 | Lichty | Apr. 12, 1921 |
| 2,514,144 | Shedlock | July 4, 1950 |
| 2,592,143 | Holtz et al. | Apr. 8, 1952 |
| 2,680,004 | Herker | June 1, 1954 |